(12) United States Patent
Conlon

(10) Patent No.: US 7,942,776 B2
(45) Date of Patent: May 17, 2011

(54) TWO-MODE ELECTRICALLY VARIABLE TRANSMISSION

(75) Inventor: Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 693 days.

(21) Appl. No.: 11/970,048

(22) Filed: Jan. 7, 2008

(65) Prior Publication Data

US 2009/0176610 A1    Jul. 9, 2009

(51) Int. Cl.
*F16H 3/72* (2006.01)
(52) U.S. Cl. ............................................................ 475/5
(58) Field of Classification Search ................. 475/5
See application file for complete search history.

(56) References Cited

U.S. PATENT DOCUMENTS

| | | | |
|---|---|---|---|
| 5,577,973 A * | 11/1996 | Schmidt ............................ | 475/5 |
| 5,931,757 A | 8/1999 | Schmidt | |
| 6,527,658 B2 | 3/2003 | Holmes et al. | |
| 7,220,203 B2 * | 5/2007 | Holmes et al. ..................... | 475/5 |
| 7,278,941 B2 * | 10/2007 | Holmes et al. ..................... | 475/5 |
| 7,300,374 B2 * | 11/2007 | Bucknor et al. .................... | 475/5 |
| 7,416,501 B2 * | 8/2008 | Holmes et al. ..................... | 475/5 |
| 7,473,199 B2 * | 1/2009 | Bucknor et al. .................... | 475/5 |

* cited by examiner

*Primary Examiner* — Ha D. Ho
(74) *Attorney, Agent, or Firm* — Quinn Law Group, PLLC

(57) ABSTRACT

An electrically variable transmission (EVT) is provided with input member and output member, first and second motor/generators, a first and a second planetary gear set, and a final drive gearset. Two torque-transmitting mechanisms that are selectively engagable alone or in different combinations to establish an electric-only operating mode, an input split mode, a compound split mode, and a neutral mode. The first torque-transmitting mechanism may be configured as a one-way clutch in parallel with a friction clutch or a dog clutch, or configured as a lockable one-way clutch. A vehicle having the EVT may be driven electrically using one or both motor/generators, up to a maximum speed of the motor/generators. There are no slipping clutches when operated in an electric-only operating mode, and the engine provides most of the power for high-speed cruising. The EVT can transition from input split mode to compound split mode by synchronous shift.

20 Claims, 5 Drawing Sheets

| ENGINE | C1 | C2 | MODE (#) |
| | C1/D1 | D2 | |
| --- | --- | --- | --- |
| OFF | x | | EVT1 / INPUT SPLIT (1) |
| ON | | x | EVT2 / COMPOUND SPLIT (2) |
| OFF | x | x | 2 MOTOR EV (3) |
| OFF | | | NEUTRAL (4) |

TWO-MODE ELECTRICALLY VARIABLE TRANSMISSION

TECHNICAL FIELD

The invention relates to a two-mode electrically variable transmission (EVT) suitable for a large battery application, the EVT having an input split mode, a compound split mode, an electric-only mode using two motors, and a neutral mode.

BACKGROUND OF THE INVENTION

An electrically variable transmission (EVT) typically has an input member connected to an engine, as well as one or two motor/generators that are connected to different members of multiple planetary gear sets to enable one or more electrically-variable modes of operation or modes, fixed speed ratio modes, and an electric-only (battery powered) mode. An "electrically variable" mode or EV mode is an operating mode in which the speed ratio between the transmission input and output members is determined by the speed of one of the motor/generators.

An EVT may improve vehicle fuel economy in a variety of ways. For instance, the engine may be turned off at idle, during periods of deceleration and braking, and during periods of relatively low speed or light vehicle load operation to thereby eliminate efficiency losses incurred due to engine drag. Captured braking energy via regenerative braking, or energy stored by one of the motors acting as a generator during periods when the engine is operating, is utilized during these "engine off" periods to extend the period or duration during which the engine is off, to supplement engine torque or power, to operate the vehicle at a lower engine speed, and/or to supplement accessory power supplies. Transient demand for engine torque or power is supplemented by the motor/generators during "engine on" periods, allowing for downsizing of the engine without reducing apparent vehicle performance. Additionally, the motor/generators are efficient in accessory power generation, and electric power from the battery serves as an available torque reserve allowing operation at a relatively low transmission speed ratio.

Electrically variable modes may be classified as input-split, output-split, compound-split, or series modes. Input-split modes have one motor/generator geared such that its speed varies in direct proportion to the transmission output, and have the other motor/generator geared such that its speed is a linear combination of the input and output member speeds. Output-split modes have one motor/generator geared such that its speed varies in direct proportion to the transmission input member, and have the other motor/generator geared such that its speed is a linear combination of the input member and the output member speeds. A compound-split mode has both motor/generators geared such that their speeds are linear combinations of the input and output member speeds, but neither is in direct proportion to either the speed of the input member or the speed of the output member. A series mode has one motor/generator geared such that its speed varies in direct proportion to the speed of the transmission input member, and another motor/generator geared such that its speed varies in direct proportion to the speed of the transmission output member. There is no direct mechanical power transmission path between the input and output members when operating in series mode, and therefore all power must be transmitted electrically.

A series propulsion system is a system in which energy follows a path from an engine to an electric storage device, and then to an electrical motor/generator which applies power to rotate the drive members. In other words, there is no direct mechanical connection between the engine and the drive members in a series propulsion system, unlike parallel propulsion systems. Therefore, transmissions with relatively large battery electric propulsion capability, and relatively small engine propulsion capability, have heretofore relied largely on what has been designated as a series-hybrid transmission or propulsion system.

SUMMARY OF THE INVENTION

An electrically variable transmission (EVT) is provided that is well suited for use with relatively large battery power and/or a relatively small engine, with reduced motor speed requirements. The EVT has an increased EV mode capability using both motor/generators. The EVT has a forward low-range electric-only operating mode in which the engine is off, a forward low-range electrically variable input split operating mode, a forward high-range compound split operating mode, and a neutral operating mode. Shifting between the available modes may be accomplished with conventional clutch-to-clutch shifts or synchronous shifts that are executed purely by changing motor speeds while operating in one of the two available EVT modes.

Specifically, the EVT includes an input member that is operatively connected to an engine, an output member, a stationary member, and first and second motor/generators. The EVT also includes first and second planetary gear sets each having first, second, and third members, and first and second torque-transmitting mechanisms that are selectively engagable alone or in different combinations to connect one of the members of one planetary gear set to the stationary member or to a member of the other planetary gear set to thereby establish a fixed ratio electric-only mode, a low-range input split mode, a high-range compound split mode, and a neutral mode.

In one aspect of the invention, the first torque-transmitting mechanism is a brake that connects the third member of the second planetary gear set to the stationary member for establishing the input split mode and/or the electric-only mode, and the second torque-transmitting mechanism is a clutch connecting the second member of the first planetary gear set to the third member of the second planetary gear set for establishing the compound split mode and/or the electric-only mode.

In another aspect of the invention, the powertrain starts the engine while the EVT is in electric-only mode, and transitions from the electric-only mode to the input-split mode by disengaging the second torque-transmitting mechanism and commanding a torque on the first motor/generator resulting in positive engine torque.

In another aspect of the invention, the first torque-transmitting mechanism is a one-way clutch positioned in parallel with a friction clutch or a dog clutch.

In another aspect of the invention, the second torque-transmitting mechanism is a dog clutch.

In another aspect of the invention, the EVT transitions directly from the output-split mode to the compound-split mode via at least one of a clutch-to-clutch shift and a synchronous shift.

In another aspect of the invention, the EVT includes an energy storage device (ESD) that is connected to the first and second motor/generators for providing power thereto and receiving power therefrom, with the ESD connectable with an offboard power supply for recharging.

In another aspect of the invention, the third member of the first planetary gear set is continuously connected to the first motor/generator. The second member of the first planetary gear set is continuously connected to the engine for common rotation therewith, and is selectively connected to the third member of the second planetary gear set via the second torque-transmitting mechanism. The third member of the second planetary gear set is selectively connected to the stationary member via the first torque-transmitting mechanism.

In another aspect of the invention, the first, second, and third members of the first planetary gear set are a ring gear, a carrier member, and a sun gear, respectively, and the first, second, and third members of the second planetary gear set are a sun gear, a carrier member, and a ring gear, respectively.

In another aspect of the invention, the first, second, and third members of the first planetary gear set are a carrier member, a ring gear, and a sun gear, respectively, and the first, second, and third member of the second planetary gear set is a carrier member.

In another aspect of the invention, a powertrain has an engine, an electrically variable transmission (EVT), a stationary member, first and second motor/generators, and an energy storage device. The powertrain also has first and second planetary gear sets, each having a ring gear, a sun gear, and a carrier member. A brake selectively connects one of the ring gear and carrier member of the second planetary gear set with the stationary member to establish the input split mode or the electric-only mode. A clutch selectively connects the ring gear or carrier member of the first planetary gear set with the ring gear or carrier member of the second planetary gear set to establish the compound split mode or the electric-only mode.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
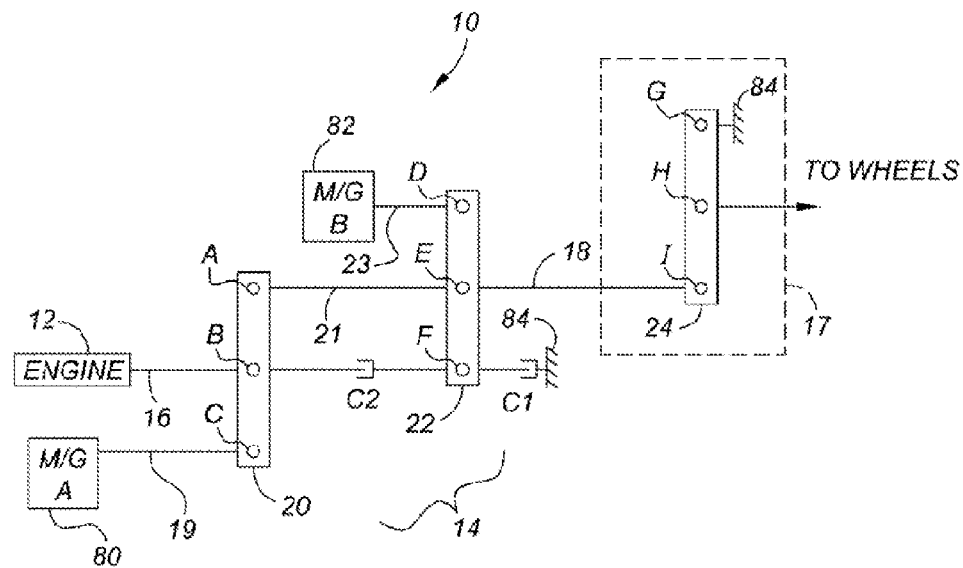
FIG. 1 is a schematic illustration of a transmission in lever diagram form.

Referring to the drawings, wherein like reference numbers refer to like components, and beginning with FIG. 1, a lever diagram is shown for a powertrain 10 having an engine 12. The powertrain 10 is a dual-EVT mode hybrid powertrain, and therefore is operable for deriving power from any or all of the engine 12, a first motor/generator 80, and a second motor/generator 82, as well as from an energy storage device or ESD 86 (see FIG. 2) as will be explained below. The engine 12 has an output shaft or member that serves as an input member 16 of an electrically-variable transmission or EVT 14. The EVT 14 is designed to selectively receive a portion of its driving power from the engine 12 in a plurality of its various operating modes, including an electric-only mode, an input split mode, a compound split mode, and a neutral mode, as will be discussed below with reference to FIG. 3. A final drive unit or assembly 17 is operatively connected to an output shaft or member 18 of the EVT 14 for propelling the vehicle (not shown). The final drive assembly 17 may also include a planetary gear set, represented by the lever 24 as discussed below, one or more parallel shaft gear sets (not shown), and/or a chain transfer mechanism (not shown), as will be understood by those of ordinary skill in the art.

The EVT 14 may be represented schematically using a pair of three-node levers 20 and 22. Each of the levers 20 and 22 represents a different planetary gear set each having a first, a second, and a third gear element or member. These members are respectively represented by the nodes A, B, and C of the lever 20, and nodes D, E, and F of the lever 22. The lever 24 of the final drive assembly 17 includes nodes G, H, and I. The lever 24, representing the final drive assembly 17, is not considered to be part of the EVT 14 within the scope of the invention, and therefore only levers 20 and 22 will be discussed further hereinbelow.

As used herein, a "node" is a component of a transmission which is characterized by a rotational speed and which can act as a junction of torques applied to that component from other components, and by that component to other components. The various nodes A-F may be embodied by a ring gear member, a sun gear member, and a carrier member having a plurality of pinion gears, although not necessarily in that particular order. The other components which may interact with a given node of the EVT 14 include other coaxial members of the same set of planetary gears which appear as other nodes on the same lever. The other components which may interact with a given node also include interconnections to members of other planetary gear sets which appear as nodes on another lever, a stationary member 84 such as a transmission case, and other transmission members, such as the input member 16 or the output member 18.

The EVT 14 has multiple interconnections. With reference to lever 20, the first motor/generator 80 (also referred to as M/G A) is continuously connected with node C of the lever 20 via the connecting member 19. Node B is continuously connected to the input member 16, and therefore with the engine 12, for common rotation therewith. Node B may also be selectively connected to node F of lever 22 to establish one of four operating modes, as will be discussed in detail below. Node A is continuously connected to node E of lever 22 via a connecting member 21.

With reference to lever 22, node D is continuously connected to the second motor/generator 82 (also referred to as M/G B) via the interconnecting member 23. Node E is continuously connected to the output member 18 for common rotation therewith. Node F may be selectively connected to stationary member 84 for establishing one of the four operating modes discussed below.

The EVT 14 also includes a pair of clutches or torque-transmitting mechanisms C1 and C2. The torque-transmitting mechanism C1 is a braking clutch, and is referred to hereinafter for simplicity as the brake C1, which is operable for selectively grounding node F of lever 22 to the stationary member 84. The torque-transmitting mechanism C2, referred to hereinafter for simplicity as the clutch C2, is selectively engagable to connect node B of lever 20 with node F of lever 22.

Figure 2:
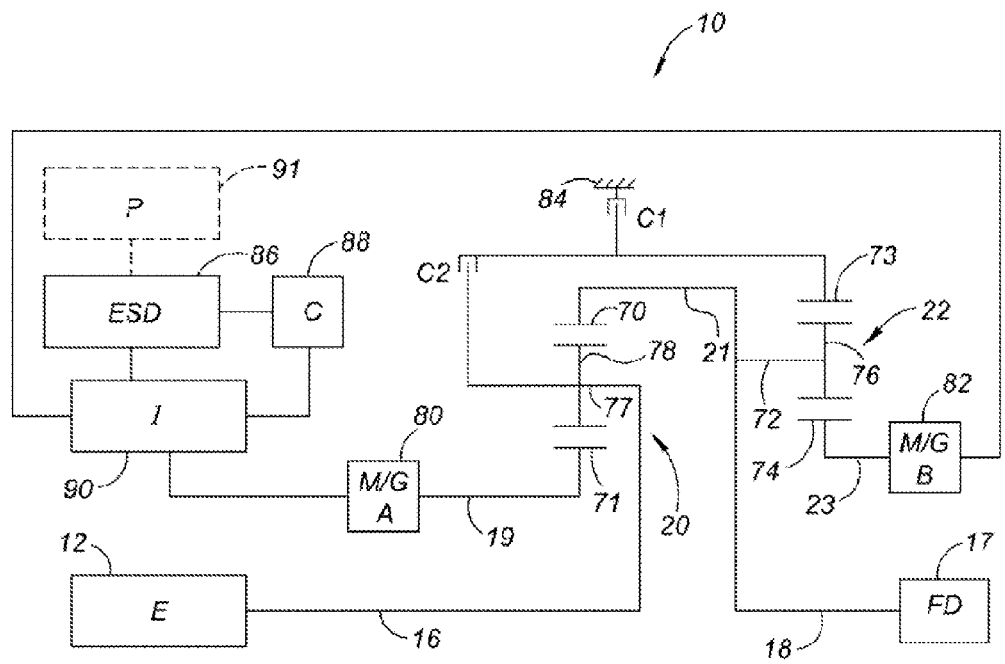
FIG. 2 is a stick diagram of an embodiment of the transmission of FIG. 1.

Referring to FIG. 2, a stick diagram is shown for a first embodiment of the powertrain 10 and the EVT 14 of FIG. 1. The levers 20 and 22 of FIG. 1 are embodied by corresponding first and a second planetary gear sets 20 and 22, respectively. For simplicity, levers 20 and 22 will be referred to hereinafter as first and second planetary gear sets 20 and 22 when not referring to the lever diagrams shown in FIGS. 1, 5, and 7. The first planetary gear set 20 has a sun gear 71, a ring gear 70, and a carrier member 77 having a plurality of pinion gears 78. The second planetary gear set 22 has a sun gear 74, a ring gear 73, and a carrier member 72 having a plurality of pinion gears 76.

The input member 16, and therefore the engine 12, is continuously connected to the carrier member 77 of the first planetary gear set 20, and the first motor/generator (M/G A) 80 is continuously connected to the sun gear member 71 of the first planetary gear set 20 via the interconnecting member 19. The ring gear member 70 of the first planetary gear set 20 is continuously connected to the carrier member 72 of the second planetary gear set 22 via the connecting member 21. The first planetary gear set 20 is selectively connectable to the second planetary gear set 22 via the clutch C2. The second motor/generator 82 (M/G B) is continuously connected to the sun gear member 74 of the second planetary gear set 22, and is operable for transmitting torque to the output member 18 depending on the position or status of the brake C1, as will be discussed below.

The powertrain 10 may be further configured with an onboard energy storage device or ESD 86 that is operatively connected to each of the respective motor/generators 80, 82 such that motor/generators 80, 82 may selectively transfer power to or receive power from the ESD 86. As used herein, an "onboard" energy storage device is any energy storage device that is mounted on the vehicle (not shown) to which the powertrain 10 with the motor/generators 80 and 82 are also mounted. The ESD 86 may be, for example, one or more batteries or battery packs. Other onboard energy storage devices, such as fuel cells or capacitors, which have the ability to provide and/or to store and dispense sufficient electric power may be used in combination with or in place of batteries.

Figure 6:
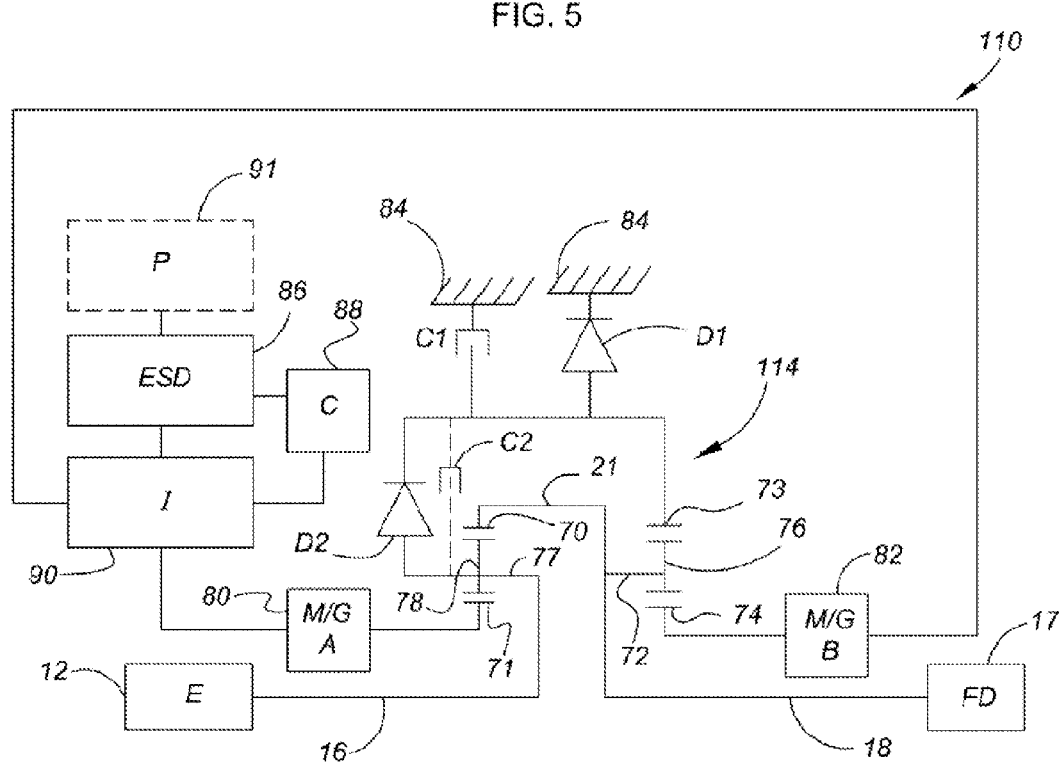
FIG. 6 is a stick diagram of the alternate embodiment of the transmission shown in FIG. 5.

An electronic control unit or controller 88, abbreviated C in FIGS. 2 and 6 for simplicity, is operatively connected to the ESD 86 to control the distribution of power to or from the ESD 86 as needed. Operating data gathered by various sensors (not shown), such as the speed of the input member 16 and output member 18, may be provided to the controller 88 as well, for various uses, such as when operating in a regenerative braking mode. As will be understood by those of ordinary skill of the art, regenerative braking capability may be accomplished by using the controller 88 as needed to balance input torque from the engine 12, from the motor/generator 80 (M/G A), and/or from the motor/generator 82 (M/G B) during braking in order to provide a desired rate of deceleration of the output member 18, and/or one or more individual braking units (not shown).

The ESD 86 may be connected to a DC-to-AC power invertor 90, labeled "inverter" in FIG. 2 for simplicity, and may also be configured for recharging via an offboard power supply system 91 when used with a plug-in style hybrid powertrain design. As used herein, an "offboard" power supply is a power supply that is not mounted on a vehicle having a powertrain 10, is not integral with the EVT 14, and is operatively connected to the ESD 86 only during periods of recharging. Different offboard power supply systems that establish connectivity between the ESD 86 and an offboard power supply system 91 for recharging of the ESD 86 are shown and described with respect to FIGS. 4A, 4B, and 4C.

Figures 3, 4A, 4B, 4C:
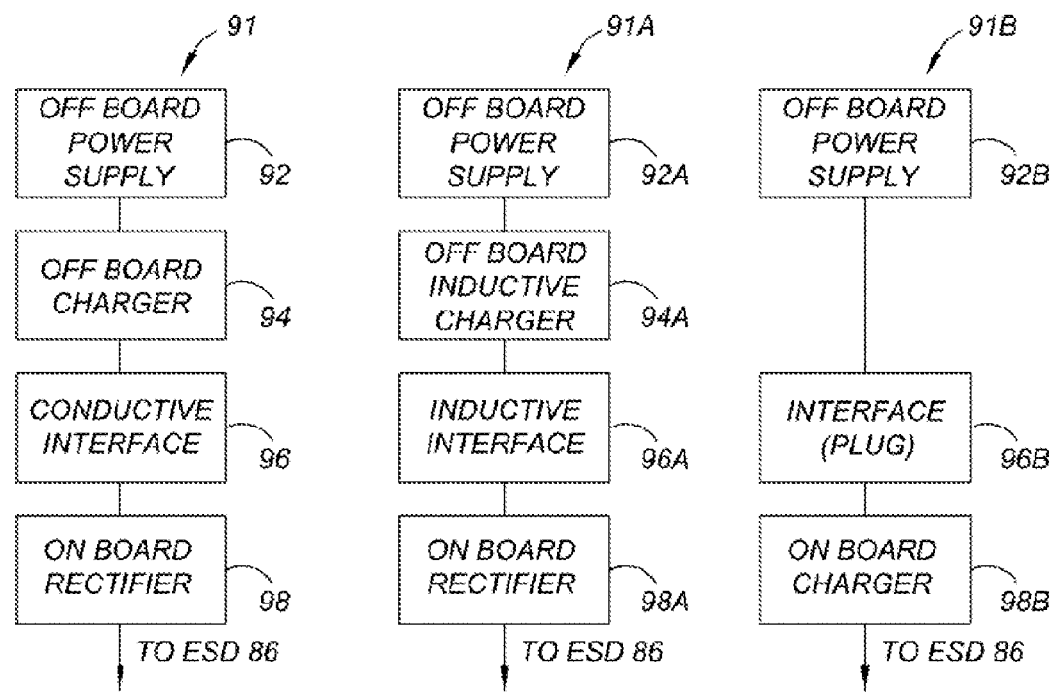
FIG. 3 is a truth table for the transmission shown in FIGS. 1, 2, 5, and 6.
FIGS. 4A-C are schematic illustrations of different offboard power supply systems for charging a battery used with the motor/generators in the transmission embodiments of FIGS. 2 and 6.

Referring to FIG. 4A, the offboard power supply system 91 includes an offboard power supply 92 and an offboard charger 94 operatively connected with the offboard power supply 92, both of which are offboard of (i.e., not mounted onboard of) a vehicle having any of the transmission embodiments described herein. Instead, an onboard/offboard conductive interface 96, such as an electrical outlet and plug, permits selective connection of the offboard components (the offboard power supply 92 and offboard charger 94) with the onboard ESD 86, optionally through an onboard rectifier 98 that is necessary only if the charger 94 supplies alternating current. The transmission embodiments described herein that utilize such an offboard power supply system 91 may be referred to as plug-in hybrid transmissions, as described hereinabove. The charger 94 is an offboard conductive-type charger that regulates the flow of electrical power from the offboard power supply 92 to ESD 86. When ESD 86 is sufficiently recharged, the connection through interface 96 is terminated, and the recharged ESD 86 is then used as discussed herein to power motor/generators 80, 82, such as in an electric-only mode.

Referring to FIG. 4B, an alternate offboard power supply system 91A is illustrated using an offboard inductive-type charger 94A to regulate the flow of power from an offboard power supply 92A, through an onboard/offboard inductive interface 96A, to ESD 86. Power flow from the inductive interface 96A is optionally through an onboard rectifier 98A, which is required if the charger 94A provides alternating current. The offboard inductive charger 94A may be an electrical coil that establishes a magnetic field when powered by the offboard power supply 92A. The inductive interface 96A may be a complementary coil that connects the offboard components (offboard power supply 92A and offboard inductive charger 94A) with the onboard components (onboard rectifier 98A and ESD 86) when positioned close enough to the offboard inductive charger 94A during recharging to allow a magnetic field generated by electrical power flowing in the inductive charger 94A to cause electrical power to flow to the onboard rectifier 98A and then to the ESD 86. When the ESD 86 is sufficiently recharged, the inductive interface 96A is no longer positioned near the offboard inductive charger 94A, and the recharged ESD 86 is then used as discussed herein to power the motor/generators 80, 82, such as in the electric-only mode.

Referring to FIG. 4C, an alternate offboard power supply system 91B is illustrated using an offboard power supply 92B and an on board charger 98B, as well as an interface 96B, such as an electrical outlet or plug, that permits selective connection of the offboard component (the offboard power supply 92B) with onboard charger 98B. The onboard charger 98B is connectable with an onboard ESD 86 (see FIGS. 2, 5a, and 5b). The transmission embodiments described herein that utilize such an offboard power supply system 91B may be used referred to as plug-in hybrid transmissions. The charger 98B is an onboard conductive-type charger that regulates the flow of electrical power from offboard power supply 92B to ESD 86. When ESD 86 is sufficiently recharged, the connection through interface 96B is terminated, and the recharged ESD 86 is then used as discussed herein to power motor/generators 80, 82, such as in an electric-only mode.

Referring to FIG. 3, a truth table presents the four operating modes of the powertrain 10 and EVT 14 of FIGS. 1 and 2, as well as the powertrain 110 and EVT 114 of FIGS. 5 and 6, and the powertrain 210 and EVT 214 of FIGS. 7-9, each of which are described below. Mode 1 describes an input-split mode, abbreviated EVT 1/Input Split, which is an electrically variable mode normally used with the engine 12 turned off. Mode 1 (EVT 1/Input Split) may be used at low-range, i.e., at low vehicle speeds, or under high vehicle loads. Mode 2 describes a high-range compound-split mode, abbreviated EVT 2/Compound Split, which is normally used when the engine 12 is turned on, such as during high vehicle speeds or under light vehicle loads. Mode 3 describes a two-motor electric-only mode, abbreviated 2 Motor EV, which is used with both of the motor/generators 80, 82 (see FIGS. 1 and 2) driving the output member 18 (see FIGS. 1 and 2) at a fixed ratio for electric-only propulsion when the engine 12 is turned off. Finally, Mode 4 is a neutral mode which effectively disconnects the second motor/generator 82 (M/G B) from the output member 18, or otherwise prevents or minimizes the amount of torque the second motor/generator 82 (M/G B) is able to transmit to the output member 18.

Referring to FIGS. 2 and 3, with the vehicle (not shown) at rest, the EVT 14 is initially placed in Mode 3 (2 Motor EV), with the brake C1 and the clutch C2 disengaged. The motor/generators 80 and 82 (M/G A and M/G B, respectively) together provide the combined torque necessary for launching the vehicle, which then may be driven by purely electrical means using the combined power of the motor/generators 80 and 82, or of either of the motor/generators 80 (M/G A) or 82 (M/G B) operating separately, as needed. By sharing power between the two motor/generators 80, 82, the efficiency of the EVT 14 is increased, and loses due to heating of the motor/generators 80, 82 are minimized. As will be understood by those of ordinary skill in the art, the top speed of a vehicle operating in Mode 3 (2 Motor EV) is limited by the maximum design speed of the motor/generators 80, 82 (M/G A, B, respectively), either of which may also be used as needed for regeneratively braking a vehicle (not shown) employing the powertrain 10. As there are no slipping clutches used while operating in Mode 3 (2 Motor EV), the efficiency of Mode 3 is thereby maximized.

To start the engine 12 while operating in Mode 3 (2 Motor EV), the clutch C2 is released and positive torque is commanded on the motor/generator 80 (M/G A), thus causing the engine 12 to increase its speed in the positive direction. Once the engine 12 reaches operating speed, the engine 12 begins to produce torque, and the EVT 14 transitions to Mode 1 (EVT 1/Input Split). Thereafter, the motor/generator 80 (M/G A) may be commanded to produce a negative torque. When operating in Mode 1 (EVT 1/Input Split), the motor/generator 80 (M/G A) acts as a generator, and the motor/generator 82 (M/G B) acts as a motor.

At relatively high rates of vehicle speed, the EVT 14 may shift from Mode 1 (EVT 1/Input Split) to Mode 2 (EVT 2/Compound Split) by releasing the brake C1 and applying the clutch C2. This may be implemented as a conventional clutch-to-clutch shift under load. Alternately, the power of the motor/generator 80 (M/G A) may be supplied by the ESD 86, allowing the EVT 14 to shift between Modes 1 and 2 (EVT/1/Input Split Mode and EVT 2/Compound Split Mode, respectively) without any torque being transmitted across slipping clutches. If the motor/generator 80 (M/G A) has a near-zero speed, i.e., the mechanical point of the input split range, the required battery power is low and the torque of the engine 12 is transmitted to the output member 18 entirely via the first planetary gear set 20 and any reaction torque provided by the motor/generator 80 (M/G A).

In this case, the brake C1 is released, the motor/generator 82 (M/G B) is allowed to decelerate to the synchronous speed, i.e., the speed at which slip across the clutch C2 is zero, and the clutch C2 is then applied. At high vehicle speeds, the EVT 14 operates in Mode 2 (EVT 2/Compound Split), thus providing a high vehicle top speed capability without requiring high motor speeds from the motor/generators 80, 82 (M/G A and M/G B, respectively). For example, at a 1:1 speed ratio, the motor and engine speeds are equal to the output speed, and the ESD 86 (see FIG. 2) and the engine 12 may combine to provide optimal vehicle performance.

The EVT 14 can easily transition from either Mode 1 (EVT 1/Input Split) or Mode 2 (EVT 2/Compound Split) to Mode 3 (2 Motor EV) by a synchronous shift to the appropriate speed ratio, and then by engaging the appropriate brake C1 and/or clutch C2. The shift between Mode 1 (EVT 1/Input Split) or Mode 2 (EVT 2/Compound Split) to Mode 3 (2 Motor EV) may also be achieved as an energy shift by engaging the appropriate brake C1 or clutch C2 to shift directly to Mode 3 (2 Motor EV).

Figure 5:
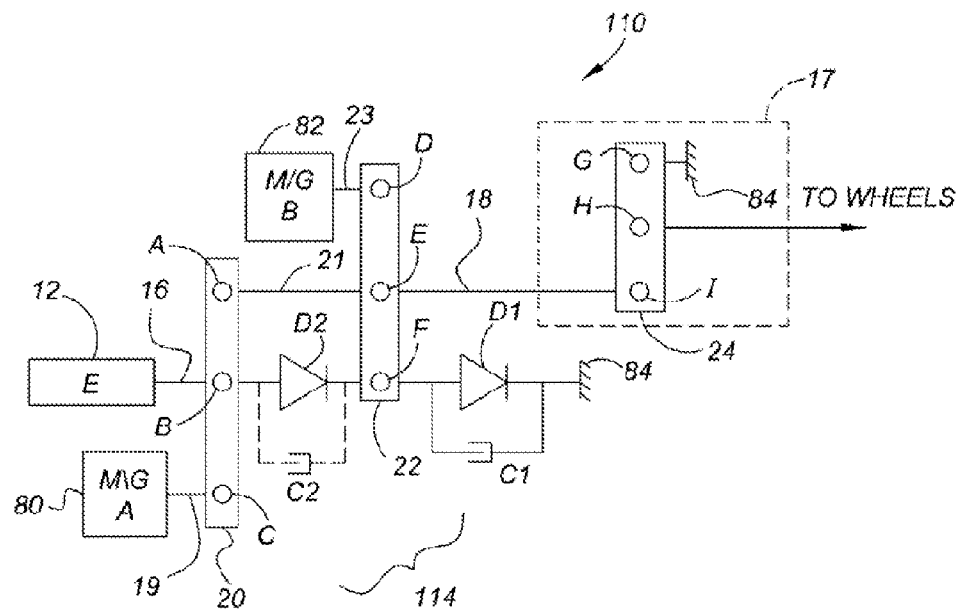
FIG. 5 is a schematic illustration of an alternate embodiment of the transmission shown in FIG. 1.

Referring to FIG. 5, another embodiment of the powertrain 10 and EVT 14 of FIG. 1 is shown as the powertrain 110 and the EVT 114. In this embodiment, one-way clutches D1 and/or D2 are used in place of the brake C1 and clutch C2 of FIG. 1 to further reduce transmission losses, cost, and complexity. For example, the clutch C2 of FIGS. 1 and 2 may be replaced with a one-way clutch D2 as shown, such as a mechanical diode-style one-way clutch, and the brake C1 might be implemented as either a one-way clutch D1 positioned in parallel with C1 as shown, i.e., a friction or a dog clutch, or as a lockable one-way clutch device. This would eliminate the need for hydraulic pressure to keep the brake C1 closed when the EVT 114 is operated in Mode 3 (2 Motor EV) at lighter loads. The parallel clutch arrangement shown in FIG. 5 provides the EVT 114 with a regenerative braking functionality and a reverse operation capability, as will be understood by those of ordinary skill in the art.

Referring to FIGS. 3 and 6, with the vehicle (not shown) at rest, the EVT 114 is in Mode 3 (2 Motor EV) as described above. Also as described above, the motor/generators 80 and 82 (M/G A and M/G B, respectively) are used to launch the vehicle (not shown), which may then be driven electrically using either or both of the motor/generators 80 and/or 82 (M/G A and/or M/G B, respectively). By sharing power between the motor/generators 80, 82, the efficiency of the EVT 114 is increased, and heating of the motor/generators 80, 82 is reduced. As with the embodiment of FIGS. 1 and 2, the top speed of a vehicle operating in Mode 3 (2 Motor EV) is limited by a maximum design speed of the motor/generators 80, 82 (M/G A, M/G B, respectively), either of which may also be used as needed to brake a vehicle (not shown) employing the powertrain 10. As there are no slipping clutches used while in Mode 3 (2 Motor EV), the efficiency of Mode 3 is thereby maximized.

To start the engine 12, positive torque is commanded on the motor/generator 80 (M/G A) to unload the one-way clutch D2 and cause the engine 12 to increase speed in a positive direction. Once the engine 12 reaches operating speed, it begins to produce torque, and the EVT 114 then transitions to Mode 1 (EVT 1/Input Split). The motor/generator 80 (M/G A) is then commanded to produce negative torque, and the EVT 114 operates as an input split EVT, wherein the motor/generator 80 (M/G A) acts as a generator and the motor/generator 82 (M/G B) acts as a motor.

For cruising, the EVT 114 may be shifted from Mode 1 (EVT 1/Input Split) to Mode 2 (EVT 2/Compound Split) by changing the sign of the torque on motor/generator 82 (M/G B) from positive to negative. This sign change is a natural consequence of motor/generator 80 (M/G A) passing through its mechanical point, i.e., zero speed point, and occurs at low numerical ratios such as overdrive. When the sign of the motor/generator 82 (M/G B) changes from positive to negative, the one-way clutch D1/C1 is unloaded, and the motor/generator 82 (M/G B) decelerates until the one-way clutch D2 engages. The EVT 114 may then operate with the motor/generator 82 (M/G 82) acting as a generator and the motor/generator 80 (M/G A) acting as a motor.

At high vehicle speeds, the EVT 114 operates in Mode 2 (EVT 2/Compound Split), thus providing high vehicle top speed capability without requiring high motor speeds. However, in this embodiment motor/generator 82 (M/G B) is not used to boost performance of the EVT 114 using the ESD 86 unless a means is provided for unlocking the clutch D2. Accordingly, most of the power required for high-speed cruising using EVT 114 would be provided by the engine 12. The EVT 114 can easily transition to an engine-off state from either of Modes 1 and 2 (EVT 1/Input Split and EVT 2/Compound Split, respectively) by synchronously shifting to a speed ratio wherein the appropriate one-way clutch D1 or D2 engages.

Figure 7:
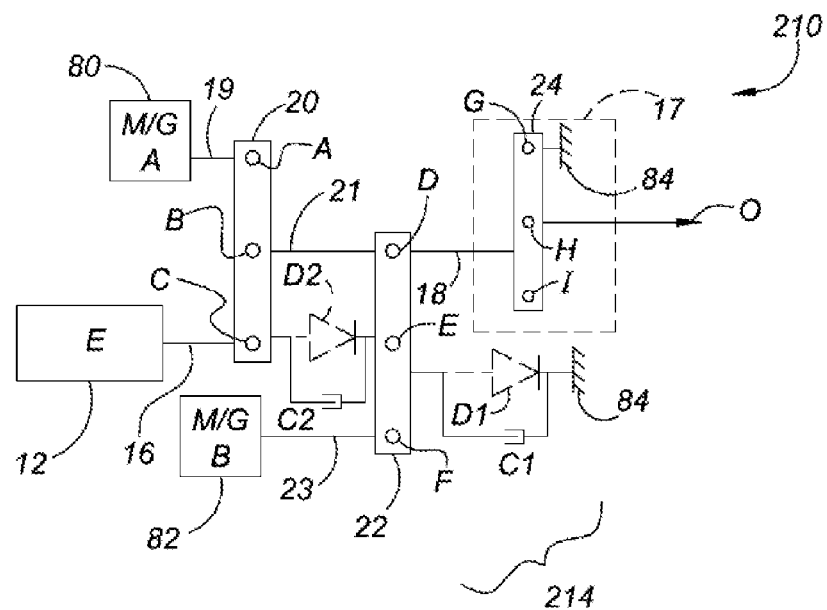
FIG. 7 is a schematic illustration of an alternate embodiment of the transmissions shown in FIGS. 1 and 5.

Referring to FIG. 7, another embodiment of the powertrain 10 and EVT 14 of FIG. 1 is shown as the powertrain 210 having an EVT 214. In this embodiment, the motor/generator 82 (M/G B) is continuously connected to node F of lever 22 via the interconnecting member 23, and the motor/generator 80 (M/G A) is continuously connected to node A of lever 20 via the interconnecting member 19. The input member 16, and therefore the engine 12, is continuously connected to node C of lever 20, with node C being selectively connectable to node E of lever 22. Node E in turn is selectively connectable to the stationary member 84.

As shown in phantom in FIG. 7, one-way clutches D1 and/or D2 may be used as described above to further reduce transmission efficiency losses, cost, and complexity as described above. For example, the one-way clutch D2 may be positioned in parallel with the clutch C2 as shown, or configured as a lockable one-way clutch device. This would eliminate the need for hydraulic pressure to keep the clutch C2 closed when the EVT 214 is operated in Mode 3 (2 Motor EV) at lighter loads. The parallel clutch arrangement shown in phantom in FIG. 7 also provides the EVT 214 with a regenerative braking functionality and a reverse operation capability, as will be understood by those of ordinary skill in the art.

Figure 8:
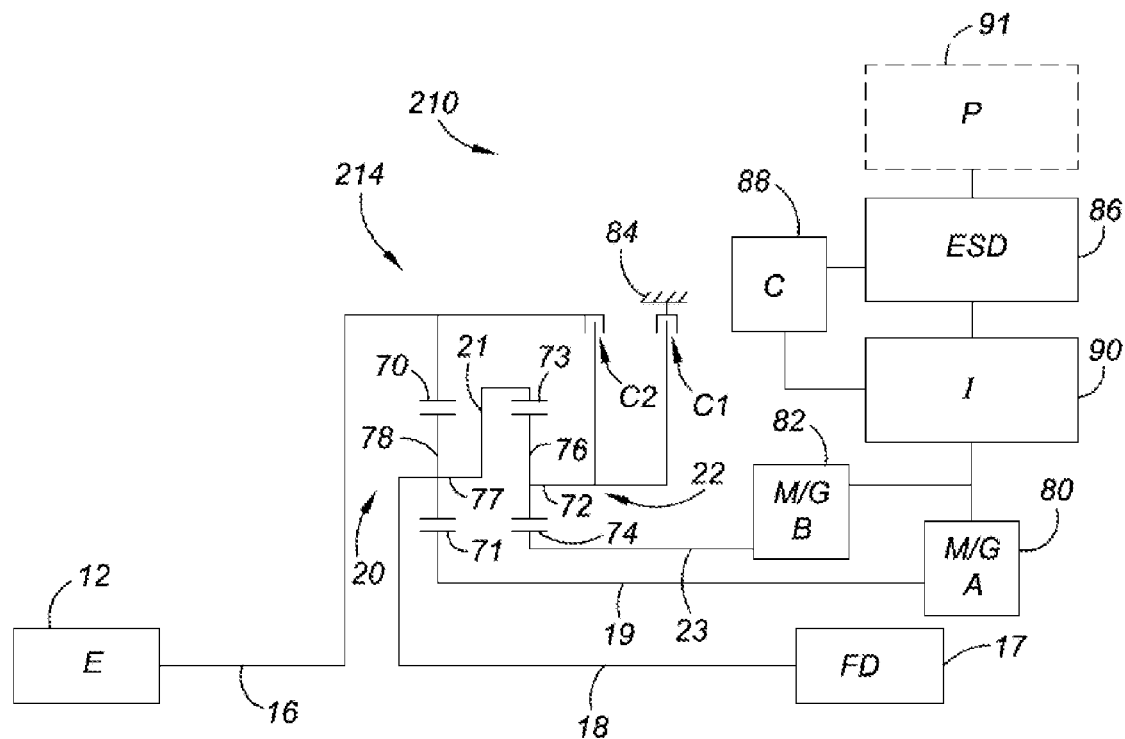
FIG. 8 is a stick diagram of a first alternate embodiment of the transmission shown in FIG. 7.

Referring to FIG. 8, one embodiment of the powertrain 210 of FIG. 7 is shown with the input member 16 connected to the ring member 70 of the first planetary gear set 20, and with the brake C1 selectively connecting the carrier member 72 to the stationary member 84. The clutch C2 selectively connects the carrier member 72 of the second planetary gear set 22 to the input member 16 and to the ring gear 70 of the first planetary gear set 20. The ring gear 73 of the second planetary gear set 22 is continuously connected to the carrier member 77 of the first planetary gear set 20 via the interconnecting member 21.

In this embodiment, the motor/generator 82 (M/G B) is continuously connected to the sun gear 74 of the second planetary gear set 22 via the interconnecting member 23, and the motor/generator 80 (M/G A) is continuously connected to the sun gear 71 of the first planetary gear set 20 via the interconnecting member 19. The final drive 17 is continuously connected to the carrier member 77 of the first planetary gear set 20. Selective engagement of the brake C1 and the clutch C2 according to the truth table of FIG. 3 described above selectively establishes one of the modes described previously hereinabove.

Figure 9:
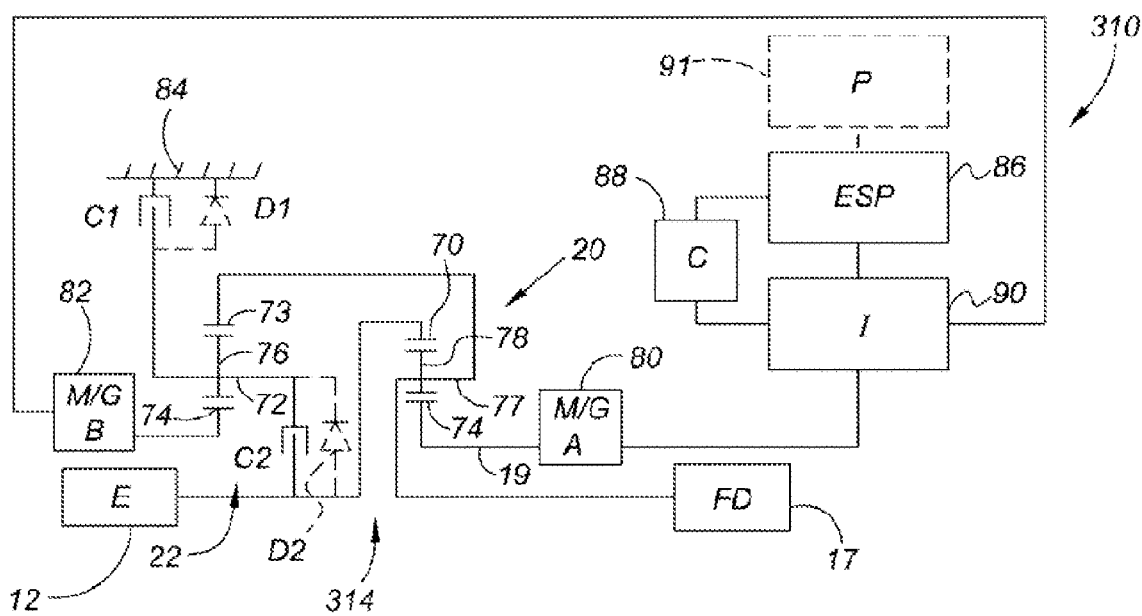
FIG. 9 is another stick diagram of a second alternate embodiment of the transmission shown in FIG. 7.

Referring to FIG. 9, an alternate configuration for the powertrain 210 of FIGS. 7 and 8 is shown as a powertrain 310, which includes an EVT 314. In this embodiment, the engine 12 is selectively connected to the carrier member 72 of the second planetary gear set 22 via the clutch C2, which may also be positioned in parallel with a one-way clutch D2 as shown in phantom, and also as described above and shown in phantom in FIG. 7. The brake C1 selectively connects the carrier member 72 of the second planetary gear set 22 to the stationary member 84, and may be alternately configured in parallel with a one-way clutch D1 as shown in phantom, and also as described above and shown in phantom in FIG. 7.

The motor/generator 82 (M/G B) is continuously connected to the sun gear 74 of the second planetary gear set 22 for common rotation therewith. The first motor/generator 80 (M/G A) is continuously connected to the sun gear 71 of the first planetary gear set 20 for common rotation therewith. The final drive 17 is continuously connected with the carrier member 77 of the first planetary gear set 20. As with each of the embodiments described previously hereinabove, the brake C1 and the clutch C2, whether or not configured with either of the one-way clutches D1 and/or D2, may be selectively applied or engaged according to the truth table of FIG. 3 to thereby execute one of the operating modes described previously hereinabove.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission (EVT) comprising:
   an input member that is connectable to an engine;
   an output member;
   a stationary member;
   first and second motor/generators;
   a first and a second planetary gear set each having respective first, second, and third members; and
   first and a second torque-transmitting mechanisms that are selectively engagable alone or in different combinations to connect one of said members of one of said first and said second planetary gear sets to said stationary member or to a member of the other of said first and said second planetary gear sets to thereby establish a fixed ratio electric-only mode, a low-range input split mode, a high-range compound split mode, and a neutral mode;
   wherein engagement of both of said first and said second torque-transmitting mechanisms establishes said electric-only mode.

2. The EVT of claim 1, wherein said first torque-transmitting mechanism is a brake that is operable for selectively connecting said third member of said second planetary gear set to said stationary member for establishing at least one of said input split mode and said electric-only mode; and
   wherein said second torque-transmitting mechanism is a clutch that is operable for selectively connecting said second member of said first planetary gear set to said third member of said second planetary gear set for establishing at least one of said compound split mode and said electric-only mode.

3. The EVT of claim 1, wherein the EVT is operable for starting said engine while the EVT is in said electric-only mode, and is further operable for transitioning from said electric-only mode to said input-split mode by disengaging said second torque-transmitting mechanism and commanding a torque on said first motor/generator in a direction that accelerates said engine in a forward direction.

4. The EVT of claim 1, wherein said first torque-transmitting mechanism is configured as a one-way clutch positioned in parallel with one of a friction clutch and a dog clutch.

5. The EVT of claim 4, wherein said second torque-transmitting mechanism is a dog clutch.

6. The EVT of claim 1, wherein the EVT is operable for transitioning directly from said input-split mode to said compound-split mode via at least one of a clutch-to-clutch shift and a synchronous shift.

7. The EVT of claim 1, further comprising:
an energy storage device operatively connected to said first and said second motor/generators for providing power to and receiving power from said first and said second motor/generators; wherein said energy storage device is configured to be operatively connectable with an offboard power supply for recharging said energy storage device.

8. The EVT of claim 1, wherein said third member of said first planetary gear set is continuously connected to said first motor/generator; said second member of said first planetary gear set is continuously connected to said engine for common rotation therewith, and is selectively connected to said third member of said second planetary gear set via said second torque-transmitting mechanism; and said third member of said second planetary gear set is selectively connected to said stationary member via said first torque-transmitting mechanism.

9. The EVT of claim 8, wherein said first member, said second member, and said third member of said first planetary gear set are a ring gear, a carrier member, and a sun gear, respectively; and
wherein said first member, said second member, and said third member of said second planetary gear set are a sun gear, a carrier member, and a ring gear, respectively.

10. The EVT of claim 8, wherein said first member, said second member, and said third member of said first planetary gear set are a carrier member, a ring gear, and a sun gear, respectively; and
wherein said third member of said second planetary gear set is a carrier member.

11. A powertrain having an electrically variable transmission (EVT), the powertrain comprising:
first and second motor/generators;
first and second planetary gear sets, each having a first, a second, and a third member;
an engine continuously connected to said second member of said first planetary gear set;
an output member continuously connected to one of said first, said second, and said third members of said second planetary gear set;
a stationary member;
a first torque-transmitting mechanism for selectively connecting said third member of said second planetary gear set to said stationary member; and
a second torque-transmitting mechanism for selectively connecting said second member of said first planetary gear set to said third member of said second planetary gear set;
wherein engagement of selected ones of said first and said second torque-transmitting mechanisms alone or in different combinations establishes an electric-only mode, a low-range input split mode, a high-range compound split mode, and a neutral mode in which said engine is off and said second motor/generator is effectively disconnected from said output member.

12. The powertrain of claim 11, wherein said EVT is operable for transitioning from said electric-only mode to said input split mode by commanding a positive torque on said first motor/generator to thereby accelerate said engine in a positive direction and disengaging said second torque-transmitting mechanism.

13. The powertrain of claim 12, wherein said EVT is operable for transitioning from said input-split mode to said compound-split mode by disengaging said first torque-transmitting mechanism and engaging said second torque-transmitting mechanism.

14. The powertrain of claim 13, wherein said EVT is operable for transitioning from said input-split mode to said compound-split mode using at least one of a clutch-to-clutch shift and a synchronous shift.

15. The powertrain of claim 11, wherein each of said first and said second torque-transmitting mechanisms is configured as a one-way clutch device.

16. The powertrain of claim 15, wherein said first torque-transmitting mechanism is selected from the group of a lockable one-way clutch and a one-way clutch that is positioned in parallel with a dog clutch.

17. A powertrain comprising:
an engine;
an electrically variable transmission (EVT) having an input member and output member;
a stationary member;
first and second motor/generators;
an energy storage device (ESD) operatively connected to each of said first and said second motor/generators for providing power to and receiving power from said first and second motor/generators, wherein said ESD is configured to be operatively connectable with an offboard power supply for recharging said ESD;
a first and a second planetary gear set each having a ring gear, a sun gear, and a carrier member;
a brake that is selectively engagable to connect one of said ring gear member of said second planetary gear set and said carrier member of said second planetary gear set with said stationary member for establishing one of an input split mode and an electric-only mode; and
a clutch that is selectively engageable to connect one of said ring gear and said carrier member of said first planetary gear set with one of said ring gear and said carrier member of said second planetary gear set to establish one of a compound split mode and said electric-only mode.

18. The powertrain of claim 16, wherein disengagement of each of said brake and said clutch establishes a neutral mode.

19. The powertrain of claim 17, wherein the powertrain is operable for using said first and said second motor/generators for launching a vehicle having the powertrain, and for propelling said vehicle using at least one of said first and said second motor/generators when said engine is off.

20. The powertrain of claim 19, wherein said first torque-transmitting mechanism is configured as a one-way clutch positioned in parallel with a dog clutch for enabling a regenerative braking functionality and a reverse operation of the powertrain.

* * * * *